United States Patent [19]

Ehrlich

[11] Patent Number: 5,656,734
[45] Date of Patent: Aug. 12, 1997

[54] METHODS FOR MAKING PECTIN AND PECTOCELLULOSIC PRODUCTS

[75] Inventor: Robert M. Ehrlich, North Hollywood, Calif.

[73] Assignee: Systems Bio-Industries, Trevose, Pa.

[21] Appl. No.: 550,118

[22] Filed: Oct. 30, 1995

[51] Int. Cl.$^6$ ............... C08B 37/06; C07H 1/06; A23K 1/00
[52] U.S. Cl. ............... 536/2; 536/128; 426/615; 426/616; 426/482; 426/479; 426/506; 426/509
[58] Field of Search ............... 536/2, 127, 128; 426/615, 616, 479, 482, 506, 509

[56] References Cited

U.S. PATENT DOCUMENTS

| | | | |
|---|---|---|---|
| 2,022,471 | 11/1935 | Leo et al. | 99/11 |
| 2,132,065 | 10/1938 | Wilson et al. | 99/132 |
| 2,452,750 | 11/1948 | Halliday et al. | 99/132 |
| 2,455,382 | 12/1948 | Nelson | 536/2 |
| 2,577,232 | 12/1951 | Cole | 536/2 |
| 3,133,053 | 5/1964 | Bender et al. | 260/209.5 |
| 3,982,003 | 9/1976 | Mitchell et al. | 426/1 |
| 4,143,172 | 3/1979 | Mitchell et al. | 426/532 |
| 4,831,127 | 5/1989 | Weibel | 536/56 |
| 4,923,981 | 5/1990 | Weibel et al. | 536/56 |

FOREIGN PATENT DOCUMENTS

| | | |
|---|---|---|
| 258743 | 11/1909 | Germany . |
| 1369 198 | 10/1974 | United Kingdom . |
| WO 91/15517 | 10/1991 | WIPO . |

OTHER PUBLICATIONS

Robert M. Ehrlich, "Pectin Selection and Proper Use," 1977 Annual Meeting of the Institute of Food Technologists, Philadelphia, PA.
Food Technology, vol. 13, No. 8, Sep. 1959; "Pectin Standardization."

*Primary Examiner*—Nathan M. Nutter
*Attorney, Agent, or Firm*—Morgan, Lewis and Bockius, LLP

[57] ABSTRACT

Pectin and Pectocellulosic compositions are prepared by heating and mixing comminuted pectin-containing material to solubilize pectin. Pectin, a pectocellulosic product, or a combination thereof is then recovered. The products produced are incorporated in food and other products.

13 Claims, 1 Drawing Sheet

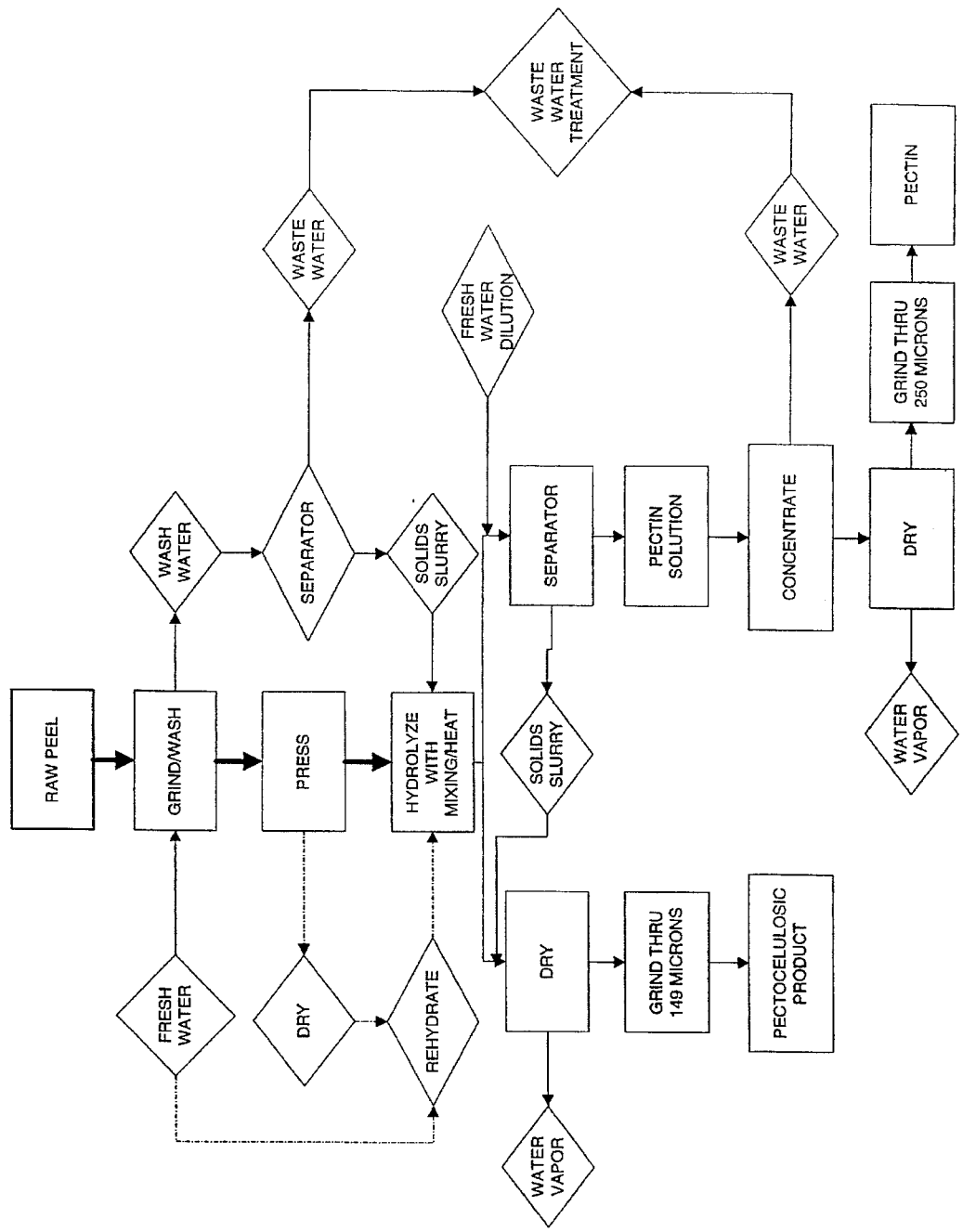
FIGURE 1: AQEOUS PECTOCELULOSIC AND/OR PECTIN PROCESS SCHEMATIC

METHODS FOR MAKING PECTIN AND PECTOCELLULOSIC PRODUCTS

BACKGROUND OF THE INVENTION

1. Field of the Invention

The present invention relates to methods for making pectin and pectocellulosic products which are used, for example, in gelling foods, cosmetics, drugs, protective colloids, emulsifying agents, and dehydrating agents.

2. Discussion of the Related Art a. Background

Pectin is a naturally occurring polymerized sugar-acid derivative belonging to a family of compounds referred to as pectic substances. A pectocellulosic product is essentially an impure pectin. Pectic substances are high molecular weight hydrocolloidal compounds related to carbohydrates, and consist chiefly of partially methoxylated galacturonic acids joined in long chains.

Pectin is primarily a component of fruit and plant cell walls and, together with other components such as cellulose and hemicelluloses, pectin constitutes both the structural tissue and the "cement" which gives rigidity to fruit and plant cells. It is present in all fruit and plant tissue in variable amounts, such as in apples and citrus fruits, some roots such as beets and carrots, tubers such as potatoes, sunflower heads, and elsewhere. Levels of pectic substances range from about 0.1 to 4% by weight of the plant's whole fruit. Apples and citrus fruits are the major commercial sources of pectin raw material. Dried apple pomace and citrus peels (wet or dried) are abundantly available as by-products of juice processing.

Pectin has long been used in the home for gelling jams employing, for example, apple core or quinces as the pectin source. Today, the fruit and confectionery industry uses pectin for its gelling properties in acid and sugar media. It is also used in cosmetics, drugs, protective colloids, emulsifying agents, and dehydrating agents. Other properties of pectin, such as its thickening properties and its gelling action in less acidic medium and in the presence of calcium, also contribute to the role of pectin in the manufacture of food and pharmaceutical products.

Polygalacturonic acids composed of anhydrogalacturonic acid units make up the basic skeleton of all pectic substances. Upon analysis, the pectic substances can be defined as weight percent anhydrogalacturonic acid ("AGA") or as galacturonic acid ("GA"). AGA depends on the degree of methylation/esterification. When expressed as weight percent GA, a polymer is calculated as if it were depolymerized to the individual acid residue. When calculated on the basis of GA, the molecular weight is 2–5% greater than its corresponding AGA content, depending upon the number of acids in the polymer that are methylated, known as the degree of methylation ("DM"). The following table explains the relationship between DM, AGA, and GA.

TABLE 1

RELATIONSHIP OF MOLECULAR WEIGHT (MW) EXPRESSED AS AGA TO MW EXPRESSED AS GA

| Pectin DM | MW of 100 AGA Units | MW as AGA ÷ MW as GA (= 194.14 × 100) |
| --- | --- | --- |
| 90 | 18,878 | 0.9724 |
| 85 | 18,808 | 0.9688 |
| 80 | 18,738 | 0.9652 |
| 75 | 18,668 | 0.9616 |
| 70 | 18,598 | 0.9580 |
| 65 | 18,528 | 0.9544 |
| 60 | 18,458 | 0.9508 |

Manufactured pectin is not 100% AGA. Nonpectic solids ("NPS"), such as neutral sugars within the polymer chain or polysaccharides associated with the polymer, are present and known as "ballast materials." Metallic ions are also associated with some of the carboxylic acids. Finally, moisture or water is also present. These all will dilute the weight percent of AGA or GA. The combined solids can be considered as total solids ("TS"). A typical pectin composition contains the following:

TABLE 2

| Component | | Wt. % As-Is | Wt. % Dry Basis |
| --- | --- | --- | --- |
| TS | AGA | 74.5 | 80.98 |
|  | Ballast | 14.5 | 15.76 |
|  | Ash (= Metals) | 3.0 | 3.26 |
|  | Moisture | 8.0 | — |
|  | TS | 92.0 | 100.0 |

If the above pectin were 80 DM, its GA content would be reported as 83.9%. This is calculated using the factor from Table 1: 80.98/0.9652=83.9. The Food Chemical Codex specifies that a pectin must contain not less than 65% AGA.

Most commercially available pectins are purified to about 70% to 80% by weight GA and have a varying DM. High methoxyl pectins, having a DM above about 50%, require sugar for gelation. They typically form gels at pH values below about 3.5 and in the presence of sugar levels above about 60%. High methoxyl pectins, which are frequently referred to as "slow" or "rapid" setting with respect to their ability to gel high concentrations of sugar, are generally used for gelling preserves and confectionery foods.

Low methoxyl pectins, having a DM between about 20% and 50%, are used for low sugar products as they do not require the presence of sugar for gelation. They form gels at wider pH ranges, but require the presence of divalent cations (i.e., metallic ions, mostly calcium) for gelation.

Selection and proper use of a pectin is dependent upon the finished product desired. High DM pectins are quite versatile, as they can be used in a broad range of conditions. For example, an 80 DM pectin can form high sugar jams or gels at pHs of 3.8–4, or it can be used to form jams having low sugar levels of 48–47% at pHs of 2.7–3. R. M. Ehrlich, "Pectin; Selection And Proper Use," 1977 Annual Meeting of the Institute of Food Technologists, Philadelphia, Pa.

A pectin's gelling capacity varies with the source and quality of the source raw material. Capacity to gel is referred to as "grade," defined as the number of sugar solids one unit of pectin will gel to a standard firmness in a specific test procedure. Pectin is standardized to 150 grade with either dextrose monohydrate or sucrose as the diluent.

The IFT SAG method ("Pectin Standardization," *Food Technology*, vol. XIII, pp. 496–500 (1959)) is the only universally accepted method of grading pectin. The SAG procedure measures gel rigidity, which is the degree to which a gel will sag within two minutes after it has been removed from a calibrated glass jar and inverted on a glass plate.

b. Prior Methods For Making Pectin And Pectocellulosic Products

Commercial pectin is obtained from plant tissues having a low GA content, such as dried citrus peel having an GA content in the range from about 20% to 30%. Prior to the present invention, extraction methods comprised hydrolysis of protopectin in warm acidic medium to release the potentially soluble pectinic acids from the cellulosic matrix. After separation of the cellulosic components, pectin was precipitated from the resulting pectic juices by, for example, using an alcohol. Typically, the resulting fibrous coagulum was alcohol washed, squeezed, vacuum dried, and then ground to obtain a fine power. The separated cellulosic components are a low volume by-product which can be used, for example, as an animal feed bulking agent.

Various methods for producing pectin-containing material were described prior to the present invention. For example, East German Patent Application No. 258743 (Abstract) describes the production of a pectin-like material for use with comminuted meats. The pectin-containing material is produced from vegetables by comminution, followed by acidification, neutralization, and mechanical dehydration.

Other methods for producing pectin-containing materials are described in U.S. Pat. Nos. 4,923,981 and 4,831,127, which relate to the preparation of "parenchymal cell" cellulose from pectin-containing materials, such as sugar beet and citrus pulp. The fruit or plant tissue is first treated with a strong acid or a strong base at high temperatures for short periods of time to release the cellulosic, hemicellulosic, and pectin components from the fruit or plant tissue without substantial degradation. The fruit or plant tissue is then subjected to physical shearing followed by separating the solid and liquid fractions of the treated mixture.

U.S. Pat. No. 4,143,172 teaches a method for producing a pectin-containing substance using comminuted citrus peel as a pectin material, and U.S. Pat. No. 3,982,003 teaches the preparation of a pectin-like material by comminution of citrus pulp comprising treating the pulp with a mild base to reduce the degree of esterification. U.S. Pat. No. 2,452,750 teaches methods for producing pectin comprising soaking comminuted citrus peel in a reagent which is a non-solvent for pectinous substances, and U.S. Pat. No. 2,132,065 describes a method for separating pectin from citrus peel using a high temperature and alkaline solvent. U.S. Pat. No. 2,022,471 refers to a process for making pectous materials using a filter aid, such as diatomaceous earth, and British Patent No. 1,369,198 describes a process for preparing simulated fruit using a pectate sol. Other methods for producing pectin-containing products are described in Application No. WO 91/15517.

Commercial methods for making high DM pectin prior to the present invention required the use of an acid. Such methods comprised a man-made methylation process, which uses acid as a catalyst and methyl alcohol as the methoxyl source, and are described in U.S. Pat. No. 3,133,053 to Bender et al. and Chemical Abstract No. 61 2401 (1964).

Each of the above references are herein incorporated by reference.

Accordingly, prior to the present invention, methods for producing commercial pectin products required extensive processing steps and the presence of an additional ingredient, an acid, resulting in an expensive, inefficient, and time-consuming manufacturing process. It is therefore desirable to provide less costly methods for producing pectin and pectocellulosic compositions from fruit and plant tissues.

SUMMARY OF THE INVENTION

This invention relates to the unexpected discovery that pectin can be hydrolyzed and/or extracted from plant tissue, such as citrus peel, without the addition of an acid. Very high methoxyl (high DM) pectin and pectocellulosic products are produced. The process also comprises aqueous manufacture of a pectin (i.e., containing 65% AGA or more).

Prior to the present invention, it was thought that the addition of a mineral or organic acid was required to lower the pH of the plant tissue for hydrolysis and extraction of pectin. Surprisingly, it was discovered that the natural pH of fruit and plant tissue is sufficient to break down plant tissue bound together by pectin, and thereby effect hydrolysis and extraction of the pectin. This discovery was even more unexpected in that the pectin produced by this novel, simplified process has a very high DM.

Additional features and advantages of the invention are set forth in the description which follows, or may be learned by practice of the invention. The objectives and other advantages of the invention will be realized and attained by the methods particularly pointed out in the written description and claims as well as the appended drawing.

Methods are provided for preparing pectin and pectocellulosic compositions from citrus peel and other pectin-containing plant materials. The methods utilize comminuted whole citrus peel, apple, sugar beet, sunflower, or the like, as a starting material. Ground and washed raw peel when heated with constant stirring/agitation eventually breaks down into a thick pumpable viscous mix containing high methoxyl pectin. Previously dehydrated citrus peel can be rehydrated and heated with constant stirring/agitation to produce the same viscous mixture.

The present invention results from the discovery that the natural pH of washed or dried plant tissue, such as citrus peel, in the range of about 3.7 to about 4.3, is sufficient to effect hydrolysis and break down the plant tissue bound together by pectin. Naturally occurring pectin having a DM as high as 85 is produced using the novel method. It may also be possible to produce pectin having even higher DM using the novel acid-free method.

It is to be understood that both the foregoing general description and the following detailed description are exemplary and explanatory and are intended to provide further explanation of the invention as claimed.

The accompanying drawing, which is included to provide a further understanding of the invention, is incorporated in and constitutes a part of this specification. It illustrates several embodiments of the invention and, together with the written description, serves to explain the principles of the invention.

BRIEF DESCRIPTION OF THE DRAWING

FIG. 1 is a process flow diagram for an aqueous pectocellulosic and/or pectin process according to the present invention.

DESCRIPTION OF THE PREFERRED EMBODIMENTS

According to the present invention, pectin and/or pectocellulosic compositions are prepared from pectin-containing fruit and plant tissue.

Lemon peel is the preferred starting material, but orange peel, lime peel, grapefruit peel, and other citrus fruit peels, as well as apple, sugar beet, sunflower (flower portion of plant), and the like, may also be used. Such citrus peels can conveniently be obtained from the citrus juice industry after the juice and many of the essential oils have been removed from the whole fruit. The citrus peel contains an outer, pigmented layer referred to as the flavedo as well as an inner white layer referred to as the albedo. Pectin is contained primarily in the albedo, although the flavedo can also be removed prior to processing according to the present invention. The peel used can be either raw, dried, or processed.

The starting material in the present invention is washed to remove excess soluble materials and frequently dried, particularly if the material is to be shipped to another location for processing. The suspended solids from the wash water can be recovered and combined with the raw peel stream (described below). If the material is not used when fresh, it is suitably treated to deactivate pectic enzymes which can degrade the pectin and pectocellulosic products of the present invention.

Several compositions can be employed as the starting material in the novel methods for producing pectin and pectocellulosic products according to the invention. First, pectocellulosic and/or pectin products can be made from ground/washed raw fruit or plant tissue combined with the suspended solids removed from the wash water. Second, pectocellulosic and/or pectin products can be made separately either from the raw peel or the suspended solids. Finally, rehydrated dried fruit or plant tissue can also be used as the raw material. Exemplary starting materials are graphically represented in FIG. 1. Other compositions useful as a starting material will also be apparent to one skilled in the art, and are also encompassed by the present invention.

For example, fresh fruit or plant tissue, such as citrus peel, can be comminuted to a particle size below about ½ inch, preferably below about ⅛ inch, prior to the treatment steps. Comminuting can be performed in conventional size reduction equipment, such as a hammermill, Rietz Disintegrator, Urschel Grinder, and the like.

As shown in FIG. 1, the addition of water to the ground/washed fruit or plant tissue is not required if the tissue is pureed (fine ground) prior to hydrolysis. The solution can be pureed using standard equipment such as a BEPEX-RIETZ Angle Disintegrator, URSCHEL Comitrol, and the like.

The hydrolyzing step is performed at an elevated temperature, preferably above about 65° C., more preferably at about 85° C. to about 90° C. Elevated temperature hydrolysis is typically carried out for a period of at least about 1 hour, preferably less than about 5 hours.

In one embodiment, pectocellulosic product is produced directly from either raw peel or dried peel. As shown in FIG. 1, the suspended solids from the wash water can be recovered and combined with the raw peel stream to increase the yield of the pectocellulosic product.

In another embodiment, the mixture formed after hydrolysis is dried and ground to produce a pectin and/or pectocellulosic product.

In still another embodiment, a fresh water dilution is added to the mixture formed after hydrolysis, followed by separating the solids slurry formed from the fresh water dilution containing dissolved pectin. The separation process can use a hydrosieve, centrifugation, or other well known methods. Dilution is necessary to separate soluble extracted pectin from the remaining insoluble solids of the extract. The pectin solution is used as is or the pectin solution is concentrated by means well known in the art, such as ultrafiltration and evaporation. In addition, the suspended solids recovered from the wash water (described above) can be combined with the raw peel stream prior to concentration to increase the final pectin yield. After concentration, the pectin can be dried and ground. The solids slurry separated from the pectin solution is dried and ground to produce a pectocellulosic product.

In one embodiment, the clarified soluble pectin stream can be purified to produce a 65% AGA pectin. Spray or drum dried pectin will contain all the soluble impurities present in the original clarified pectin extract. Concentrating by ultrafiltration will remove the low molecular weight solubles, with final purity dependent upon the molecular weight cut-off of the ultrafiltration membrane. The following diagram graphically shows this embodiment:

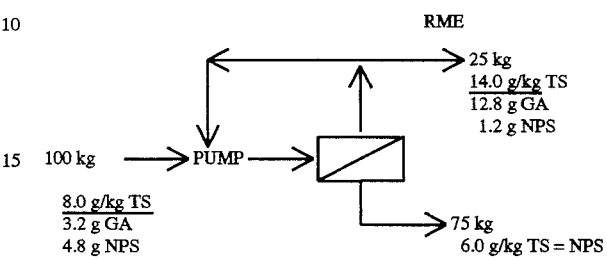

A multistage bleed-and-feed ultrafiltration system is depicted theoretically where the feed stream is concentrated 4×, as well as the GA content within the feed stream, without a loss. Only 25% of NPS is retained in the concentrate. This increases the percent GA in the TS from 40 to 91.4%. If an 80 DM at 90% TS is produced from the concentrate, the GA to AGA relationship would be:

$$82.26\% \text{ GA} = 79.40\% \text{ AGA}.$$

Minor portions of either cellulosic material or solubilized pectin can be removed to either increase or decrease the final pectin content of the pectin and/or pectocellulosic product. Moreover, additional pectin, such as commercial pectin, can be added to the solubilized pectin solution to enhance the pectin content of the final pectin and/or pectocellulosic product. Other variations of these methods are also apparent from the flow diagram given in FIG. 1.

Drying of the solids slurry or pectin concentrate is done using ovens, spray, or drum dryers and/or under vacuum with standard equipment. Spray dryers such as a Damrow Filtermat spray dryer or a BEPEX-UNISON pulse combustion spray dryer are generally preferred.

Typically, the dried pectocellulosic product is comminuted to a size sufficiently small so that it may be added directly to many food products without an undesirable effect on texture. This size is generally below about 80 mesh, and preferably below about 100 mesh.

The processes of the present invention can also be performed in a batch mode or a continuous manner. Further, the process conditions described are generally suitable for any of the starting materials described above.

The pectocellulosic compositions of the present invention will have a weight percent of pectin (measured as galacturonic acid) from about 15% to about 30%, usually being from about 20% to about 25%, and often from about 22% to about 23% GA based on the whole product, including cellulosic matrix.

The pectin products of the invention will have a weight percent of pectin from about 60 to about 90 DM, usually being from about 70 to about 85 DM, and often from about 75 to about 85 DM.

Commercial pectins are diluted with either dextrose or sucrose to control the pectin's gel strength at 150 SAG grade. One gram of 150 SAG pectin can gel 150 grams of sugar in a standard gel, under standard conditions (*Food Technology* 13:496 (1959). The 150 SAG grade pectins have a pectin content in the range from about 50 wt. % to 60 wt.

% GA in comparison to the pectin content of from about 15 wt. % to 20 wt. % GA of the products of the present invention.

Surprisingly, the pectin and pectocellulosic compositions of the present invention have a greater gelling activity than commercial pectins. That is, the amount of pectin in the pectin and pectocellulosic products of the present invention required to obtain a desired level of gelling is less than the amount of commercial pectin required to obtain the same level of gelling. This higher degree of gelling based on the actual weight of pectin utilized is equivalent to a "higher activity." The higher activity translates into a reduction in actual pectin usage (measured as GA) of from, for example, about 25% to about 35% by weight. Thus, the novel processes of the invention require fewer and cheaper materials to produce a more potent product than that made by other known commercial techniques.

Accordingly, the present invention provides novel processes for producing pectin and pectocellulosic products, which require fewer starting materials to produce a more potent product. The novel methods are less expensive as compared to existing manufacturing methods which require the addition of an acid or base to effect hydrolysis.

The pectin and pectocellulosic compositions produced using the novel methods of the invention are useful in the gelling of the aqueous phase of various products. For example, the compositions may be used in food products, such as jams, food spreads, confections, and the like. The compositions may also be incorporated into a wide variety of food and other products requiring a gelling activity in the aqueous phase of the product, such as bread dough, fruit for yogurt, yogurt, jams, fruit spreads, confections, and the like.

It will be apparent to those skilled in the art that various modifications and variations can be made in the methods of the present invention without departing from the spirit or scope of the invention. Thus, it is intended that the present invention cover the modifications and variations of this invention provided they come within the scope of the appending claims and their equivalents.

The following examples are offered by way of illustration and do not limit the scope of the claimed invention.

EXAMPLE 1

Lemon peel obtained from juice/oil processing was ground, washed, and pressed to 9.9% total solids (TS). 2400 g of the solids peel mixture was combined with 600 g tap water to form a peel-water mixture. The peel-water mixture, having a pH of 4.1, was heated to 86°–90° C. with constant stirring. The mixture was then held at temperature for 3 hours with continuous agitation when the mixture became a thick slurry.

The slurry was spread in a thin layer on trays and oven dried for 6 hours at 55° C. The dried pectocellulosic product came off the trays in flakes and was ground to pass through a 149 micron screen opening. The ground product was analyzed for pectin DM, TS, GA, and SAG grade (IFT method 5–54). Results were:

| | |
|---|---|
| Pectin DM | 81.8 |
| TS (%) | 94.0 |
| GA (% Dry Basis) | 24.0 |
| SAG Grade | 65.0 |

Strawberry jam was made with the ground pectocellulosic product where 3.7 g was mixed with 20 g sugar and dispersed into 450 g crushed strawberries. The mixture was brought to a rolling boil when 530 g of sugar was added in two steps with continuous stirring. About two-thirds of the sugar was first added at the boil. The mixture was then brought back to a rolling boil and the remaining third of the sugar was added. The mixture was again brought back to a rolling boil and citric acid was added as 2.5 ml of a 50% (w/v) solution. The hot jam batch was cooled to 922 g net weight, poured into jars, sealed, and cooled.

The finished product jam contained 4 g pectocellulosic product per kg at 65.0 Brix and 3.31 pH. Jam color, flavor, and texture were comparable to commercial products.

EXAMPLE 2

Lemon peel from juice/oil processing was ground, washed, and pressed to 11.9% total solids (TS). 1694 g of the ground lemon peel was then combined with 1306 g tap water to form a peel-water mixture. The peel-water mixture, having a pH of 4.3, was heated to 90°–95° C. with constant stirring until the mixture became a thick slurry. The mixture was then held at temperature for 3 hours with continuous agitation when the mixture became a thick slurry.

The slurry was diluted to 9600 g with boiling tap water and filtered to clarify with the aid of diatomaceous earth. The diluted slurry tested 25% volume solids using a DeLaval Gyrotester and the clarified filtrate tested 0.15% volume solids. The volume solids values are comparable to the feed and effluent process streams when using a high speed disk-stack centrifuge to clarify.

The filtrate was cooled to room temperature in a cold water bath and mixed with two parts 100% isopropanol (IPA) to precipitate the soluble pectin. The fibrous IPA-precipitated pectin was recovered by draining through a muslin cloth and pressing. The pressed pectin precipitate was washed with 60% IPA followed by soaking in 100% IPA.

The drained/pressed fibrous pectin precipitate was dried in an oven tray for 4 hours at 55° C. and then ground to pass through an 841 micron screen opening. The ground pectin was analyzed for DM, TS, GA, and SAG grade (IFT Method 5–54). Results were:

| | |
|---|---|
| Pectin DM | 84.6 |
| TS (%) | 95.5 |
| GA (% Dry Basis) | 78.0 |
| SAG Grade | 194.0 |

EXAMPLE 3

A high DM pectocellulosic product useful, for example, in the preparation of jams, was made using the following procedures.

Suspended solids from the wash water of ground and washed lemon peel obtained from juice/oil processing was used as the raw material. A 3000 g quantity of wash water containing 4% total solids (TS) with a pH of 4.1 was heated to 88°–90° C. with constant stirring and held at temperature for 3 hours when the mixture became a thick slurry.

The pectocellulosic product slurry was spread in a thin layer on trays, oven dried, ground, and analyzed as in Example 1. Results were:

| | |
|---|---|
| Pectin DM | 79.8 |
| TS (%) | 93.9 |
| GA (% Dry Basis) | 18.6 |
| SAG Grade | 45.0 |

A strawberry jam was made with 4 g pectocellulosic product per kg jam following the procedures of Example 1. The jam had a 65.5 Brix and a 3.20 pH. It's color, flavor and texture were similar to that produced in Example 1.

EXAMPLE 4

A high DM pectocellulosic product useful, for example, in the preparation of jams, was made using the following procedures.

Suspended solids from the wash water of ground and washed lemon peel obtained from juice/oil processing was used as the raw material. A 3000 g quantity of wash water containing 4.3% total solids (TS) and a pH of 3.7 was heated to 88°–90° C. with constant stirring and held at temperature for 4 hours and 45 minutes when the mixture became a thick slurry.

The resultant slurry was spread in a thin layer on trays, oven dried, ground, and analyzed as in Example 1. Results were:

| | |
|---|---|
| Pectin DM | 78.9 |
| TS (%) | 93.8 |
| GA (% Dry Basis) | 19.8 |
| SAG Grade | 47.0 |

A strawberry jam was made with 5 g pectocellulosic product per kg jam following the procedures of Example 1. The jam had a 66.0 Brix and a 3.40 pH. Its color, flavor, and texture were similar to that produced in Example 1.

EXAMPLE 5

A high DM pectocellulosic product useful, for example, in the preparation of jams, was made using the following procedures.

Dehydrated ground, washed, and pressed lemon peel obtained from juice/oil processing was used as the raw material. To prepare the raw material, 240 g of dried lemon peel was rehydrated in 2760 g tap water at a pH of 4.0 with constant stirring. After 30 minutes, the hydrated peel mixture was heated to 85°–89° C. and held at temperature for 4 hours with continuous agitation when the mixture became a thick slurry.

The slurry was spread in a thin layer on trays and oven dried for 7.5 hours at 55° C. The dried flakes were ground and analyzed as in Example 1. Results were:

| | |
|---|---|
| Pectin DM | 82.2 |
| TS (%) | 95.7 |
| GA (% Dry Basis) | 22.5 |
| SAG Grade | 54.0 |

A strawberry jam was made with 4 g pectocellulosic product per kg jam following the procedures of Example 1. The jam had a 66.4 Brix and pH of 3.30. Its color, flavor, and texture were similar to that produced in Example 1.

EXAMPLE 6

Lemon peel from juice/oil processing was ground, washed, and pressed to 10.5% total solids (TS). 1700 g of the ground lemon peel was then combined with 425 g deionized water to form a peel-water mixture. The peel-water mixture, having a pH of 3.9, was heated to 95°–100° C. with constant stirring and held at temperature for 4 hours with continuous agitation when the mix became a thick slurry.

The slurry was spread in a thin layer on trays and oven dried for 7.5 hours at 55° C. The dried flakes were ground and analyzed as in Example 1. Results were:

| | |
|---|---|
| Pectin DM | 80.4 |
| TS (%) | 94.3 |
| GA (% Dry Basis) | 27.4 |
| SAG Grade | 65.0 |

A strawberry jam was made with 4 g pectocellulosic product per kg jam following the procedures of Example 1. The jam had a 65.2 Brix and a 3.33 pH. Its color, flavor, and texture were similar to that produced in Example 1.

Although the foregoing invention has been described in detail for purposes of clarity of understanding, it will be obvious that certain modifications may be practiced within the scope of the following claims.

I claim:

1. A method for preparing pectin and pectocellulosic compositions from a pectin-containing raw material comprising:

comminuting the raw material;

washing the ground material with water to remove soluble solids;

heating and mixing the comminuted raw material to form a hydrolyzing mixture under conditions selected to at least partially solubilize the pectin; and isolating a product selected from the group consisting of pectin, a pectocellulosic product, and a combination thereof.

2. The method of claim 1, wherein the raw material is selected from the group consisting of citrus peel, sugar beet, apple, and sunflower.

3. The method of claim 1, wherein the raw material is selected from the group consisting of fresh fruit material, dried fruit material, fresh plant material, dried plant material, and a combination thereof.

4. The method of claim 3, further comprising pureeing the fresh raw material prior to heating and mixing.

5. The method of claim 1 comprising heating the raw material for at least one hour.

6. The method of claim 5, comprising heating the raw material for less than 5 hours.

7. The method of claim 1 comprising heating the starting material at a temperature above about 65° C.

8. The method of claim 7 comprising heating the starting material at a temperature between about 85° C. and about 90° C.

9. The method of claim 1, wherein the isolating step is carried out by a method selected from the group consisting of filtration, ultrafiltration, centrifugation, precipitation, evaporation, drying, and a combination thereof.

10. The method of claim 1, wherein the process steps are performed in a batch mode or in a continuous mode.

11. The method of claim 1, further comprising adding pectin to the solubilized pectin solution formed after the comminuted starting material is heated and mixed to enhance the pectin content of the final pectocellulosic product.

12. The method of claim 1, further comprising
   recovering the suspended solids from the wash water; and combining the solids with a clarified soluble pectin stream separated from the hydrolyzing mixture, to produce a high DM pectin.

13. The method of claim 1, further comprising recovering the suspended solids from the wash water; and combining the solids with a pectocellulosic product separated from the hydrolyzing mixture, to produce a high DM pectocellulosic product.

* * * * *